(12) United States Patent
David et al.

(10) Patent No.: US 8,431,279 B2
(45) Date of Patent: Apr. 30, 2013

(54) HYDROGEN STORAGE MATERIAL

(75) Inventors: William I. F. David, Chilton (GB);
Marco Sommariva, Chilton (GB); Peter P. Edwards, Oxford (GB); Simon R. Johnson, Oxford (GB); Martin Owen Jones, Oxford (GB); Elizabeth Anne Nickels, Oxford (GB)

(73) Assignee: Isis Innovation Limited, Oxford (GB)

( * ) Notice: Subject to any disclaimer, the term of this patent is extended or adjusted under 35 U.S.C. 154(b) by 553 days.

(21) Appl. No.: 12/672,594

(22) PCT Filed: Aug. 8, 2008

(86) PCT No.: PCT/GB2008/002699
§ 371 (c)(1),
(2), (4) Date: Apr. 6, 2010

(87) PCT Pub. No.: WO2009/022108
PCT Pub. Date: Feb. 19, 2009

(65) Prior Publication Data
US 2012/0021311 A1    Jan. 26, 2012

(30) Foreign Application Priority Data
Aug. 10, 2007    (GB) .................................. 0715649.0

(51) Int. Cl.
H01M 8/10    (2006.01)
H01M 8/06    (2006.01)
H01M 10/0562    (2010.01)
H01M 8/04    (2006.01)
H01M 8/00    (2006.01)
C01B 6/06    (2006.01)

(52) U.S. Cl.
USPC ............ 429/416; 429/408; 429/512; 429/322

(58) Field of Classification Search .................. 429/416, 429/322, 408, 512
See application file for complete search history.

(56) References Cited

U.S. PATENT DOCUMENTS

| 2,968,523 | A | 1/1961 | Cunningham et al. |
| 6,251,349 | B1 | 6/2001 | Zaluska et al. |
| 6,811,764 | B2 * | 11/2004 | Jorgensen et al. ......... 423/658.2 |
| 8,193,113 | B2 * | 6/2012 | Soloveichik et al. ......... 502/202 |
| 2005/0069488 | A1 * | 3/2005 | Zhao et al. .................. 423/658.2 |
| 2005/0191235 | A1 * | 9/2005 | Vajo et al. ..................... 423/657 |
| 2007/0189960 | A1 * | 8/2007 | Yamamoto ................. 423/648.1 |

OTHER PUBLICATIONS

Amendola et al., "An Ultrasafe Hydrogen Generator: Aqueous, Alkaline Borohydride Solutions and Ru Catalyst," American Chemical Society Division of Fuel Chemistry, American Chemical Society, US 44(4):864-868, 1999.

Li et al., "Materials for Designing Metal Borohydrides: Viewpoints from Thermodynamical Stabilities," Journal of Alloys and Compounds 446-447:315-318, 2007.

Nickels et al., "Tuning the Decomposition Temperature in Complex Hydrides: Synthesis of a Mixed Alkali Metal Borohydride," Angew. Chem. Int. Ed. 47:2817-2819, 2008.

* cited by examiner

*Primary Examiner* — Milton I Cano
*Assistant Examiner* — Deneen Gaynor
(74) *Attorney, Agent, or Firm* — Clark & Elbing LLP

(57) ABSTRACT

Novel mixed alkali metal borohydrides are disclosed which can be used as hydrogen storage materials.

12 Claims, 2 Drawing Sheets

HYDROGEN STORAGE MATERIAL

CROSS-REFERENCE TO RELATED APPLICATIONS

This application is the U.S. national stage filing under 35 U.S.C. §371 of international application PCT/GB2008/002699, filed Aug. 8, 2008, which claims priority from Great Britain Patent Application 0715649.0, filed Aug. 10, 2007.

FIELD OF THE INVENTION

The present invention relates to novel mixed alkali metal borohydrides which can be used as hydrogen storage materials.

BACKGROUND TO THE INVENTION

The proposed hydrogen economy has great promise as a clean alternative to fossil fuels. Hydrogen gas is first generated from a primary energy source (such as a nuclear plant or a renewable energy source) and is then stored. The stored $H_2$ is transported to a point-of-use, where energy is generated either by direct combustion of hydrogen gas or by using it as a feed component in an electrochemical fuel cell.

In principle, the combination of a fuel cell and a hydrogen storage device provides an environmentally friendly power source capable of application in any situation where electricity is required. Such applications include on-site uses such as industrial facilities (for example, those at inaccessible locations such as oil rigs), laboratories, back-up systems for key buildings (for example, hospitals), traffic lights and remote sensors. On-board applications include vehicles, laptop computers, mobile telephones and personal music players.

A number of practical difficulties present a significant obstacle to the immediate, widespread use of hydrogen as an environmentally friendly energy source. A suitable hydrogen storage device must fulfil a number of criteria, including: high storage capacity (by weight); high storage density; favourable kinetics and temperatures/pressures for release of hydrogen; and safe containment of $H_2$ prior to its release. For many applications, for example on-board applications, the storage of hydrogen in pressurised or cryogenically cooled form is impractical for a number of reasons. These include the still relatively poor storage density of pressurised or liquid $H_2$, the weight contribution of the apparatus required to achieve the necessary pressurisation/liquefaction, and (in the case of liquid $H_2$) the high energy cost of maintaining cryogenic cooling.

Hydrogen storage densities higher than that of liquid hydrogen can be achieved by storing the $H_2$ in a storage material. Alkali metal borohydrides have been extensively studied as potential hydrogen storage materials. These compounds can be caused to release hydrogen either by thermal decomposition or hydrolysis. Lithium borohydride ($LiBH_4$), sodium borohydride ($NaBH_4$) and potassium borohydride ($KBH_4$) have hydrogen contents of 18.5%, 10.7% and 7.5% by weight, respectively. These values compare favourably with, for example, the US Department of Energy's 2010 mobile storage target of 6.5 wt %.

Sodium borohydride is the only alkali metal borohydride to have been marketed as a hydrogen storage material on a commercial level until now. However, the release of hydrogen from this material by hydrolysis requires the use of a ruthenium catalyst, while the release of hydrogen by thermal decomposition requires heating to 400° C.

SUMMARY OF THE INVENTION

It has now been found that the thermal decomposition temperature and hydrolysis chemistry of alkali metal borohydrides can be controlled by modifying their cationic composition. This allows the hydrogen release characteristics of a borohydride to be manipulated, which in turn provides a means of tailoring the properties of the compound for end use as a hydrogen storage material in any desired context.

Accordingly, the present invention provides a compound which is a mixed alkali metal borohydride of the following formula:

wherein $\alpha + \beta + \chi + \delta + \epsilon = 1$; and each of $\alpha$, $\beta$, $\chi$, $\delta$ and $\epsilon$ is, independently, greater than or equal to zero and less than 1. These compounds represent a novel class of alkali metal borohydrides and are suitable for use as hydrogen storage materials.

The invention also provides a process for producing a compound which is a mixed alkali metal borohydride as defined above, which process comprises: heating together two or more compounds selected from $LiBH_4$, $NaBH_4$, $KBH_4$ $RbBH_4$ and $CsBH_4$, in appropriate amounts, at a temperature of from 50 to 500° C. in the presence of an inert gas or under vacuum; and recovering the resulting product.

The present invention further provides alternative processes for producing a compound which is a mixed alkali metal borohydride as defined above, which processes comprise:

dissolving two or more compounds selected from $LiBH_4$, $NaBH_4$, $KBH_4$, $RbBH_4$ and $CsBH_4$, in appropriate amounts, in a solvent to form a solution; heating the solution under reflux; and recovering the resulting product; and combining together two or more compounds selected from LiH, NaH, KH, RbH and CsH, in appropriate amounts, to form a mixture; reacting the mixture with $B_2H_6$ gas; and recovering the resulting product.

Still further, the present invention provides a hydrogen storage device, which device comprises at least one compound which is a mixed alkali metal borohydride as defined above. The invention also provides the use of a compound which is a mixed alkali metal borohydride as defined above as a hydrogen storage material.

Yet further, the present invention provides a battery, which battery comprises at least one compound which is as defined above and is a superionic conductor.

DETAILED DESCRIPTION OF THE INVENTION

Figure 1:
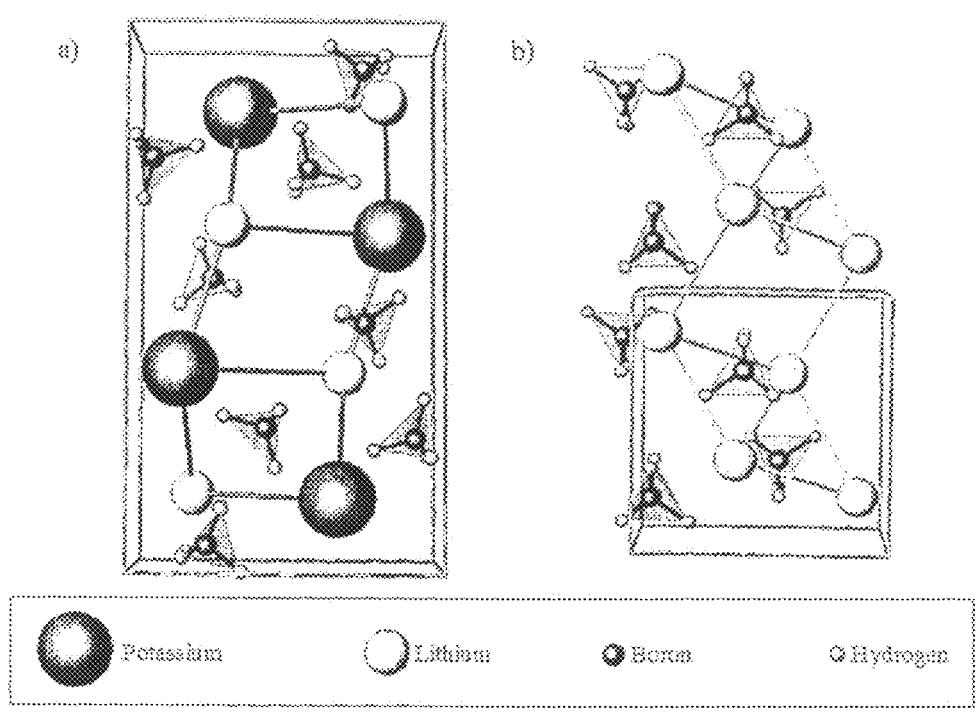
FIG. 1 shows the crystal structure of (a) pure $LiK(BH_4)_2$ and (b) orthorhombic $LiBH_4$.

The mixed alkali metal borohydrides of the present invention have the general formula $Li_\alpha Na_\beta K_\chi Rb_\delta Cs_\epsilon BH_4$ as defined above. In these novel compounds, the following conditions apply: $0 \leqq \alpha < 1$; $0 \leqq \beta < 1$; $0 \leqq \chi < 1$; $0 \leqq \delta < 1$; $0 \leqq \epsilon < 1$; and the sum of the indices $\alpha$, $\beta$, $\chi$, $\delta$ and $\epsilon$ is equal to 1. The final condition ensures charge balancing between the cationic species and the anionic borohydride. Since each of the indices $\alpha$, $\beta$, $\chi$, $\delta$ and $\epsilon$ is a variable that takes a value of zero or a fractional number greater than zero and less than 1, at least two alkali metal metals must be present in a compound of the invention to ensure charge balancing. This means that no more than three of the indices $\alpha$, $\beta$, $\chi$, $\delta$ and $\epsilon$ may equal zero in a compound of the invention.

The compound of the invention may be any of the following: a binary metal compound in which any three of $\alpha$, $\beta$, $\chi$, $\delta$ and $\epsilon$ are equal to zero, "binary metal compound" meaning that two different alkali metals are present; a ternary metal compound in which any two of $\alpha$, $\beta$, $\chi$, $\delta$ and $\epsilon$ are equal to zero; a quaternary metal compound in which any one of $\alpha$, $\beta$, $\chi$, $\delta$ and $\epsilon$ equal to zero; or a quinary metal compound in which none of $\alpha$, $\beta$, $\chi$, $\delta$ and $\epsilon$ is equal to zero.

A compound of the present invention may possess any stoichiometry, subject to the proviso that the conditions on the values of the (variable) indices $\alpha$, $\beta$, $\chi$, $\delta$ and $\epsilon$ are satisfied. The term "stoichiometric" as used herein means, with respect to any two or more alkali metals, that the index referring to a first alkali metal, [AM], is the same as the index referring to a second alkali metal, [AM'], and so on. In other words, the mole fractions of the metals [AM], [AM'], and so on, are the same. Thus a stoichiometric binary metal compound of the invention comprising Li and K has the formula $Li_{0.5}K_{0.5}BH_4$. A stoichiometric ternary metal compound of the invention comprising Li, Na and K has the formula $Li_{0.33}Na_{0.33}K_{0.33}BH_4$.

The alkali metals may be present in the compounds of the invention in stoichiometric or non-stoichiometric quantities with respect to one another. In one embodiment, all of the constituent alkali metals are present in stoichiometric quantities. In another embodiment, all of the alkali metals present are stoichiometric to plus or minus 30%, typically to plus or minus 20%, more typically to plus or minus 10%. As used herein, stoichiometric to plus or minus n % means that the mole amount of each alkali metal present in the compound differs by not more than n % from the mole fraction that would correspond to the compound having equal mole fractions of all alkali metals present in the compound. For example, in a quaternary metal compound the mole fraction that would correspond to the compound having equal mole fractions of all alkali metals present in the compound is 0.25. Thus the compound is stoichiometric to plus or minus 30% if all of the non-zero indices are between 0.175 and 0.325 (=0.25 plus or minus 0.25×0.3); the compound is stoichiometric to plus or minus 20% if all of the non-zero indices are between 0.2 and 0.3 (=0.25 plus or minus 0.25×0.2); and the compound is stoichiometric to plus or minus 10% if all of the non-zero indices are between 0.225 and 0.275 (=0.25 plus or minus 0.25×0.1).

In a further embodiment, a compound of the invention as defined above may comprise one or more alkali metals in major amounts and one or more other alkali metals in minor amounts, wherein the alkali metals in minor amounts are effectively present as dopants. For instance, a ternary metal compound of the invention may comprise first and second alkali metals in mole amounts close to the stoichiometric quantity of a binary metal compound, i.e. with indices close to 0.5, and a third alkali metal in a significantly smaller amount which substitutionally replaces one or both of the first and second alkali metals. The formula of the resulting compound is, for instance, represented as $[AM]_{0.5-x}[AM']_{0.5-y}[AM'']_{x+y}BH_4$, wherein [AM], [AM'] and [AM''] are, respectively, first, second and third alkali metals, and x and y are the degrees of doping in the [AM] and [AM'] positions, respectively.

In another example of an embodiment including dopants, the compound of the invention is a quaternary metal compound in which different alkali metals replace the "main" alkali metals. An example of the formula for such a compound is $[AM]_{0.5-x}[AM']_{0.5-y}[AM'']_x[AM''']_yBH_4$ in which [AM] and [AM'] represent the two "main" alkali metals which are present in major amounts, and [AM''] and [AM'''] represent two different alkali metals which are present in minor amounts as dopants. The skilled person would be able to readily identify many other similar such compounds.

In order to maximise the hydrogen storage capacity of the compounds of the invention by weight, lithium is typically present as one of the constituent alkali metals. Accordingly, in a typical embodiment, $\alpha$ is not equal to zero. The presence of sodium and/or potassium may also be desirable for the same reason. At least one of $\beta$ and $\chi$ is therefore typically also not equal to zero.

In one embodiment, a compound of the invention as defined above is selected from binary alkali metal borohydrides, ternary alkali metal borohydrides and quaternary metal compounds. In particular, a compound of the invention as defined above is selected from binary alkali metal borohydrides and ternary alkali metal borohydrides. More particularly a compound of the invention is a binary alkali metal borohydride.

Examples of preferred binary metal compounds of the invention include $Li_\alpha Na_\beta BH_4$, $Li_\alpha K_\chi BH_4$, $Li_\alpha Rb_\delta BH_4$ and $Na_\beta K_\chi BH_4$ in which $\alpha$, $\beta$, $\chi$ and $\delta$ are as defined above. In the binary metal compounds it is further preferred that the alkali metals be present in stoichiometric or near-stoichiometric quantities. An example of a particularly preferred compound is stoichiometric or near-stoichiometric $Li_\alpha K_\chi BH_4$. Preferred ternary metal compounds of the invention include $Li_\alpha Na_\beta K_\chi BH_4$, $Li_\alpha Na_\beta Rb_\delta BH_4$, $Li_\alpha Na_\beta Cs_\epsilon BH_4$, $Li_\alpha K_\chi Rb_\delta BH_4$, $Li_\alpha K_\chi Cs_\epsilon BH_4$ and $Na_\beta K_\chi Rb_\delta BH_4$, in which $\alpha$, $\beta$, $\chi$ and $\delta$ are as defined above. An example of a preferred quaternary metal compound of the invention is $Li_\alpha Na_\beta K_\chi Rb_\delta BH_4$, in which $\alpha$, $\beta$, $\chi$ and $\delta$ are as defined above.

In a preferred embodiment of the present invention, the compound of the invention is not stoichiometric or near-stoichiometric $Na_\beta K_\chi BH_4$.

Typically, the compounds of the invention are stable compounds. For example, the compounds of the invention preferably do not separate into monoborohydrides under ambient conditions. Preferably the compounds of the invention do not separate into monoborohydrides on exposure to water.

As noted above, the present invention also provides processes for producing a compound of the invention as defined above. In a first process of the invention, a mixed alkali metal borohydride is produced by heating together two or more compounds selected from $LiBH_4$, $NaBH_4$, $KBH_4$, $RbBH_4$ and $CsBH_4$ in appropriate amounts. An appropriate amount of each borohydride reagent in this context is determined by the target mixed alkali metal borohydride.

Typically, the process involves heating the borohydride reagents at a temperature of from 50 to 500° C. and recovering the resulting product after reaction has occurred. The temperature is typically from 80 to 400° C., for example not less than 100° C., or not greater than 250° C. Typically, the reaction is performed for a time of from 1 hour to 50 hours, for example not less than 5 hours, typically not more than 20 hours. The borohydride reagents may be ground together before being heated.

Moisture, air and nitrogen should be excluded when the process is carried out. Accordingly, the process is typically performed in the presence of an inert gas, such as a flowing argon atmosphere, or under vacuum. Alternatively the reagents may be mixed together under an inert atmosphere and then placed under vacuum before heating.

In an alternative process of the invention, a compound of the invention may be synthesised by the direct interaction of the individual metal borohydrides in a solvent. The process thus comprises dissolving two or more compounds selected from $LiBH_4$, $NaBH_4$, $KBH_4$, $RbBH_4$ and $CsBH_4$ in appropriate amounts in a solvent to form a solution; heating the solution under reflux; and recovering the resulting product.

The solvent can be an organic solvent or an inorganic solvent. Non-limiting examples of suitable organic solvents include tetrahydrofuran (THF) and ether. Non-limiting examples of suitable inorganic solvents include ammonia ($NH_3$) and ionic liquids. Because the reagent mixture is heated under reflux conditions, the temperature is typically close to the boiling point of the solvent used. For example, if the solvent is THF, the temperature is typically from 60 to 80° C., for example not less than 65° C., or not more than 70° C. The reflux is typically performed for a period of from 1 hour to 20 hours, for example not less than 5 hours, or not more than 10 hours. The resulting product may be soluble or insoluble in the chosen solvent. If the product is insoluble, it will be obtained as a precipitate and may be isolated from the solvent by filtration. If the product is soluble, it may be isolated by evaporation or distillation of the solvent.

In a further alternative process of the invention, a compound of the invention may be synthesised by the direct interaction of the alkali metal hydrides with diborane ($B_2H_6$). The process thus comprises combining together two or more compounds selected from LiH, NaH, KH, RbH and CsH in appropriate amounts to form a mixture; reacting the mixture with $B_2H_6$ gas; and recovering the resulting product.

Typically the metal hydrides are intimately mixed, preferably by being ground together, and are then exposed to flowing $B_2H_6$ gas. The mixing (and grinding) of the hydrides is typically performed in the presence of an inert gas or under vacuum. The well-mixed alkali metal hydrides are placed in a suitable reaction vessel and the $B_2H_6$ gas is flowed over the hydrides to cause the reaction. A suitable reaction vessel is one that is not reactive to alkali metal hydrides or borohydrides, for example a stainless steel reaction vessel. Typically, the $B_2H_6$ gas is flowed over the hydrides for a time of from 1 hour to 50 hours, for example not less than 5 hours, for example more typically for not more than 20 hours.

The novel mixed alkali metal borohydrides of the invention are capable of releasing hydrogen by analogous mechanisms to those by which hydrogen is released from known, single alkali metal borohydrides. Thus, the compounds of the present invention are susceptible to thermal decomposition and hydrolysis, both of which result in the release of hydrogen gas from the material. Importantly, however, the thermodynamics and kinetics of hydrogen release are modified by the simultaneous presence of more than one alkali metal in the same compound. This means that hydrogen release can be tailored to the desired end use by modifying the alkali metal composition of the novel compounds.

The mixed alkali metal borohydrides of the invention can have distinct solid-state structures, decomposition temperatures and hydrolysis properties compared to single alkali metal borohydrides having similar hydrogen weight capacities. This is demonstrated clearly in the Example which follows. This shows that the novel binary metal compound $Li_{0.5}K_{0.5}BH_4$, which has an almost identical weight to the known hydrogen storage material $NaBH_4$, possesses a $LiBH_4$-type structure. As a potential hydrogen storage material, $LiBH_4$ itself suffers from the major disadvantages of high reactivity with water and combustivity in air, as well as high cost. $Li_{0.5}K_{0.5}BH_4$ provides a structural analogue of $LiBH_4$ which is cheaper and less hazardous than $LiBH_4$ but which decomposes at a lower temperature than $NaBH_4$.

The compounds of the invention can be decomposed by heating to release hydrogen gas. Elemental boron and binary metal hydrides may also be formed. The temperatures at which the decomposition occurs are different from, and typically intermediate between, the decomposition temperatures of the single metal borohydrides from which they are derived. For example, as is shown in the accompanying Example, the decomposition temperature of $Li_{0.5}K_{0.5}BH_4$ has been found to be close to 380° C., intermediate between the decomposition temperatures of $LiBH_4$ (330° C.) and $KBH_4$ (500° C.). By altering the cationic content of the mixed metal borohydride, the decomposition temperature could be further adjusted to meet the particular demands of the end-use of the compound.

The compounds of the invention can also be hydrolysed. Addition of water, optionally in the presence of a catalyst such as ruthenium, results in an exothermic reaction to release hydrogen gas. Compounds of the general formula $[AM]BO_2$ are generally also formed, where [AM] represents an alkali metal. Thus, for example, hydrolysis of $Li_{0.5}K_{0.5}BH_4$ may release hydrogen via the equation:

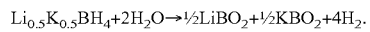
$$Li_{0.5}K_{0.5}BH_4 + 2H_2O \rightarrow \tfrac{1}{2}LiBO_2 + \tfrac{1}{2}KBO_2 + 4H_2.$$

Thermal decomposition and hydrolysis of the novel mixed alkali metal borohydrides of the invention both lead to the release of hydrogen gas. The compounds are therefore useful as hydrogen storage materials. These hydrogen storage materials may be used in any industrial application where electricity is required. Accordingly, the present invention further provides a hydrogen storage device, which device comprises at least one compound of the invention as defined above. In one embodiment, the device is capable of releasing hydrogen by exploiting the hydrolysis reaction of a compound of the invention. In a further embodiment, the device is capable of releasing hydrogen by exploiting the thermal decomposition of a compound of the invention.

A hydrogen storage device of the invention is suitable for use in conjunction with any hydrogen-exploiting energy source. Examples of hydrogen-exploiting energy sources include, for example, a hydrogen fuel cell and a hydrogen combustion engine. The device is operated by heating or hydrolysing the compound of the invention which is contained in the device. The hydrogen gas thereby released is directed from the storage device to an associated hydrogen-exploiting energy source. Once the compound of the invention contained in the device has been used up and substantially no mixed metal borohydride remains in the device, chemical reprocessing of the material can be performed to regenerate the mixed metal borohydrides and so permit recycling of the device. Typically, a hydrogen storage device of the invention will be supplied in a form that permits ready connection and disconnection from the hydrogen-exploiting energy source. Thus, used-up devices can be readily replaced with fresh (or freshly recycled) devices, for example in the form of cartridges.

In a preferred embodiment, for reasons of weight, the hydrogen storage device of the invention comprises a compound of the invention in which one of the alkali metals is lithium. In a further preferred embodiment, the hydrogen storage device of the invention comprises a compound of the invention in which one of the alkali metals is sodium. Given the high gravimetric hydrogen content of both $LiBH_4$ and $NaBH_4$, substantial modification of these base structures with heavier elements is possible, while still retaining a high weight percentage of hydrogen.

In accordance with the above transformations, the present invention further provides the use of a compound of formula $Li_\alpha Na_\beta K_\chi Rb_\delta Cs_\epsilon BH_4$ in a hydrogen storage device. The compound is capable of releasing hydrogen by way of thermal decomposition or hydrolysis.

The hydrogen storage device can be used in on-board or stationary applications, and indeed in any setting where a supply of electricity is required. It may thus be used in batteries and with fuel cells; in industrial facilities such as power stations, including installations at remote locations such as oil rigs; in back-up power supplies for domestic and communal environments such as schools and hospitals; in shipping; in traffic lights, remote sensors and the like; and in mobile vehicles, laptop computers, mobile telephones and personal music players. In a preferred embodiment, the hydrogen storage device of the present invention is used in an on-board application, for example in a vehicle.

In a further preferred embodiment of the invention, the mixed alkali metal borohydride of the invention is a superionic conductor. A superionic conductor is a solid state material that is capable of conducting electricity via the motion of ions through voids in the overall crystal lattice of the material. Such materials are well known to be useful in applications such as batteries.

The invention will be further described in the following Example.

EXAMPLE

Thirteen samples of general composition $nLiBH_4:(12-n)KBH_4$ (where n=0, 1, 2, . . . , 12) were prepared in an identical fashion. Appropriate molar quantities of $LiBH_4$ and $KBH_4$ (Sigma-Aldrich) were ground together under an inert argon atmosphere, packed into an alumina crucible and placed in a quartz tube. The tube was capped with a Young's tap and evacuated to $10^{-6}$ mbar. After sealing, all the samples were heated to 125° C. for 12 hours.

The products thus formed were analysed by X-ray diffraction. High-resolution X-ray diffraction data of all thirteen samples were collected on the ID31 diffractometer (ESRF, Grenoble) at a wavelength of 0.79953 Å and a step size of 0.003 Å. All X-ray data consisted of sharp Bragg peaks, indicating a high degree of crystallinity across the whole reaction series.

Detailed structural modelling of these diffraction data was then performed to characterise the products. The profile refinement program TOPAS was used (Bruker AXS (2006): TOPAS V4.0; "General profile and structure analysis software for powder diffraction data"). The presence of $LiBH_4$ and $KBH_4$ Bragg peaks was observed across the full composition range, together with a number of prominent additional peaks, which were indexed to a single extra phase with an orthorhombic structure and lattice constants of a=7.91337(5) Å, b=4.49067(3) Å and c=13.84396(11) Å. The b-axis lattice parameter for this new phase was very similar to that of the short axis in orthorhombic $LiBH_4$ (space group Pnma, a=7.17858(4) Å, b=4.43686(2) Å and c=6.80321(4) Å), demonstrating the high degree of structural similarity between the phases. Assessment of the extinction symbol associated with the space group of the new phase using DASH (W. I. F. David, K. Shanidand and N. Shankland, Chem. Commun., 1998, 8, 931) indicated the most probable symbol to be Pn-a, which corresponds to space groups Pn21a and Prima. This further indicated the structural similarity between the new phase and $LiBH_4$, which adopts the space group Pnma. The composition of the new phase was elucidated from a comparison of the lattice volumes of the precursors, $LiBH_4$ and $KBH_4$, which have volumes per formula unit of 54.2 Å and 76.1 Å, respectively. The new phase had a volume per formula unit of 123.0 Å (assuming four formula units per unit cell, which is consistent with the extinction symbol Pn-a), which was approximately the sum of the values for $LiBH_4$ and $KBH_4$ (130.3 Å). This clearly indicated that the new phase corresponded to the novel compound $LiK(BH_4)_2$.

Simulated annealing studies whereby one potassium and two boron atoms (which dominate the scattering) were allowed to move within the asymmetric unit of Pn21a were performed. All three atoms were minimized to positions consistent with the special position of (x, ¼, z) in Pnma. Subsequent optimisation of the structure fit was thus performed in this centrosymmetric space group, with these three atoms and the Li atom restricted to the (x, ¼, z) plane. Although lithium is a relatively weak scatterer, multiple simulated annealing analyses consistently returned the same lithium coordinates, with the observed Li—B distances consistent to those in LiBH4 (see Table 1). Finally, two rigid-body constrained $BH_4$-groups were allowed to rotate around the independent B positions. Two H atoms were found to lie on the (x, ¼, z) plane with the two other hydrogens related to one another by the mirror plane along (x, ¼, z) for both $BH_4$-tetrahedra. This arrangement of H atoms is identical to the orientation of the $BH_4$-groups in orthorhombic $LiBH_4$. In the final refinement, the quality of the data was sufficient to allow the coordinates of all hydrogen atoms to be refined unconstrained. The refinement details and structural coordinates are listed in Table 1. A schematic diagram representing the crystal structure of the new phase, together with that for orthorhombic $LiBH_4$ is shown in FIG. 1.

The $BH_4^-$ units in $LiK(BH_4)_2$ form an approximately tetrahedral coordination around $Li^+$, similar to that found in orthorhombic $LiBH_4$. The Li—B bond distances are greater in $LiK(BH_4)_2$ than in $LiBH_4$ but with a narrower range of angles. These similarities are expected, since the two structures share a common space group. The larger Li—B separations observed in the new phase originate from the presence of potassium cations in the structure, which are considerably larger than their lithium counterparts (the $Li^+$ radius is 0.059 nm, whereas the $K^+$ radius is 0.138 nm).

The arrangement of the $BH_4^-$ units in $LiK(BH_4)_2$ and $KBH_4$ differ considerably as $KBH_4$ crystallizes in a cubic structure in the FM3-M space group. Thus, $KBH_4$ has an octahedral arrangement of $BH_4^-$ units, while those in $LiK(BH_4)_2$ might be best described as mono-capped trigonal prisms.

All of the K-B distances in $KBH_4$ are reported as 3.3640 Å whereas in $LiK(BH_4)_2$, the distances are twice 3.403869(18) Å, twice 3.408520(14) Å, twice 3.430517(13) Å, and once 3.474630(19) Å. It is thought that these larger separations arise due to the greater number of $BH_4^-$ units present around the potassium cation.

TABLE 1

Refined crystallographic data for LiK(BH$_4$)$_2$

| Atom | x | y | z | B$_{iso}$(Å$^2$) |
|---|---|---|---|---|
| K | 0.33814(12) | 0.25 | 0.86851(7) | 3.42(2) |
| Li | 0.1885(9) | 0.25 | 0.1349(6) | 3.42(2) |
| B1 | 0.2508(7) | 0.25 | 0.5460(4) | 2.38(6) |
| H11 | 0.324(2) | 0.456(4) | 0.5288(13) | 2.38(6) |
| H12 | 0.206(4) | 0.25 | 0.614(2) | 2.38(6) |
| H13 | 0.140(4) | 0.25 | 0.498(2) | 2.38(6) |
| B2 | 0.9292(7) | 0.25 | 0.2397(4) | 2.38(6) |
| H21 | 0.976(2) | 0.452(4) | 0.2057(15) | 2.38(6) |
| H22 | 0.789(4) | 0.25 | 0.218(2) | 2.38(6) |
| H23 | 0.960(4) | 0.25 | 0.316(2) | 2.38(6) | a = 7.91337(5) Å
b = 4.49067(3) Å
c = 13.84396(11) Å
V = 491.964(10) Å$^3$
M = 75.7225 gmol$^{-1}$,
Pnma, Z = 4
R$_{wp}$ = 10.344%
R$_{exp}$ = 6.467%
c$^2$ = 1.600

As a result of the differing symmetry applied by the Pnma and FM3-M space groups, the BH$_4^-$ units in LiK(BH$_4$)$_2$ resemble more closely those found in orthorhombic LiBH$_4$ rather than KBH$_4$. Specifically, while KBH$_4$ has all equivalent B—H distances, those in orthorhombic LiBH$_4$ and LiK(BH$_4$)$_2$ are separated into two equivalent pairs due to the action of the mirror plane along (x, ¼, z). LiK(BH$_4$)$_2$ was found to have a narrower range of B—H bond lengths than LiBH$_4$ (0.1354 Å compared with 0.2512 Å in LiBH$_4$).

The new phase, LiK(BH$_4$)$_2$, was found to be present across the full range of the reaction series, and the lattice constants for LiK(BH$_4$)$_2$ remained constant to one decimal place for all precursor ratios, with optimal LiK(BH$_4$)$_2$ yield obtained for a precursor ratio of 2:1 LiBH$_4$:KBH$_4$.

A gravimetric analysis was undertaken on a sample of LiK(BH$_4$)$_2$ with minority LiBH$_4$ and KBH$_4$ impurities (77.5 wt % LiK(BH$_4$)$_2$, 11.2 wt % LiBH$_4$ and 11.2 wt % KBH$_4$. The experiment was performed using a Hiden Ischochema Intelligent Gravimetric Analyser. The heating rate was 2° C./min to 400° C. and the environment was a dynamic vacuum at 10$^{-6}$ mbar.

Figure 2:
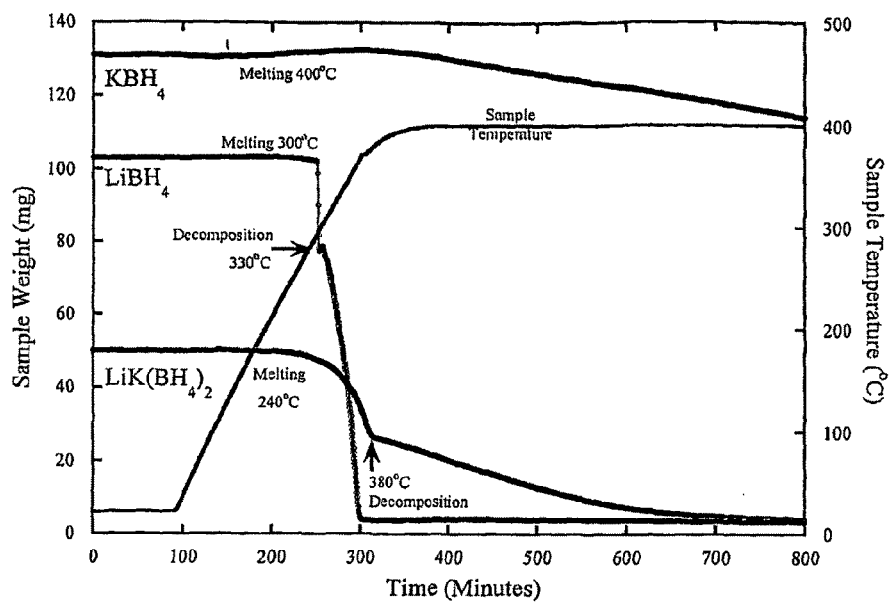
FIG. 2 shows thermogravimetric data obtained from thermogravimetric analysis of a mixture of 77.5 wt % $LiK(BH_4)_2$, 11.2 wt % $LiBH_4$ and 11.2 wt % $KBH_4$ as a function of time. Also shown, on the same Figure, is the corresponding sample temperature. The left-hand y-axis represents the sample weight, in mg, and the right-hand y-axis represents the sample temperature, in ° C. The x-axis represents time in minutes.

The results of this analysis are shown in FIG. 2. The thermogravimetric data for each of the three borohydrides present in the sample are shown as a function of time. Also shown in the Figure is the sample temperature as a function of time. The LiK(BH$_4$)$_2$ melted at 240° C. (at just over 200 minutes) and then decomposed at 380° C. (observable in the Figure at just over 300 minutes). The melting point was intermediate between the measured melting points of the pure metal borohydrides (240° C. and 400° C. for LiBH$_4$ and KBH$_4$, respectively). The decomposition temperature of LiK(BH$_4$)$_2$ was also intermediate between the two pure metal borohydrides (330° C. for LiBH$_4$, whereas KBH$_4$ did not decompose under the experimental conditions—its decomposition temperature is known to be around 500° C.).

Figure 3:
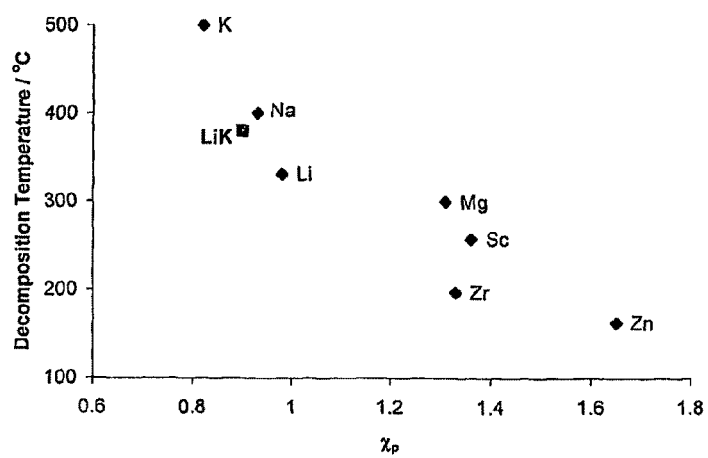
FIG. 3 shows the thermal decomposition temperature of a number of metal borohydrides as a function of their Pauli electronegativity. The y-axis represents temperature in ° C. and the x-axis represents Pauli electronegativity, $\chi_p$.

FIG. 3 shows a comparison of thermal decomposition temperature with Pauling electronegativity for LiK(BH$_4$)$_2$ (average electronegativity of Li and K) together with a number of previously known borohydride materials. The data for LiK(BH$_4$)$_2$ fitted well with the correlation identified by Nakamori et al., and sits in between that for lithium and potassium. It should be noted that LiK(BH$_4$)$_2$, which is almost of identical formula weight to 2×NaBH$_4$, has a lower decomposition temperature than NaBH$_4$.

The gravimetric analysis clearly demonstrated that the thermodynamics of hydrogen release from alkali metal borohydrides can be substantially modified via the synthesis of the mixed metal borohydrides of the invention.

The invention claimed is:

1. A compound which is a mixed alkali metal borohydride of the following formula:

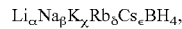

Li$_\alpha$Na$_\beta$K$_\chi$Rb$_\delta$Cs$_\epsilon$BH$_4$, wherein: $\alpha+\beta+\chi+\delta+\epsilon=1$; and
each of $\alpha$, $\beta$, $\chi$, $\delta$ and $\epsilon$ is, independently, greater than or equal to zero and less than 1.

2. A compound according to claim 1, wherein a is not equal to zero.

3. A compound according to claim 1, wherein at least one of $\beta$ and $\chi$ is not equal to zero.

4. A compound according to claim 1, which compound has a formula selected from the formulae Li$_\alpha$Na$_\beta$BH$_4$, Li$_\alpha$K$_\chi$BH$_4$, Li$_\alpha$Rb$_\delta$BH$_4$, Na$_\beta$K$_\chi$BH$_4$, Li$_\alpha$Na$_\beta$K$_\chi$BH$_4$, Li$_\alpha$Na$_\beta$Rb$_\delta$BH$_4$, Li$_\alpha$Na$_\beta$Cs$_\epsilon$BH$_4$, Li$_\alpha$K$_\chi$Rb$_\delta$BH$_4$, Li$_\alpha$K$_\chi$Cs$_\epsilon$BH$_4$, and Li$_\alpha$Na$_\beta$K$_\chi$Rb$_\epsilon$BH$_4$.

5. A compound according to claim 1, wherein the mole fraction of each alkali metal present in the compound differs by not more than 25% from the mole fraction that would correspond to said compound having equal mole fractions of all alkali metals present in the compound.

6. A compound according to claim 5, wherein the mole fractions of all of the alkali metals present in the compound are equal.

7. A compound according to claim 6, which compound has the formula Li$_{0.5}$K$_{0.5}$BH$_4$.

8. A hydrogen storage device, which device comprises at least one compound which is a mixed alkali metal borohydride as defined in claim 1.

9. A device according to claim 8, which is capable of releasing hydrogen by exploiting the hydrolysis reaction of a compound which is a mixed alkali metal borohydride as defined in claim 1.

10. A device according to claim 8, which is capable of releasing hydrogen by exploiting the thermal decomposition of a compound which is a mixed alkali metal borohydride as defined in claim 1.

11. A compound according to claim 1, which compound is a superionic conductor.

12. A battery, which battery comprises at least one compound as defined in claim 11.

* * * * *

UNITED STATES PATENT AND TRADEMARK OFFICE
CERTIFICATE OF CORRECTION

PATENT NO. : 8,431,279 B2  Page 1 of 1
APPLICATION NO. : 12/672594
DATED : April 30, 2013
INVENTOR(S) : William I. David et al.

It is certified that error appears in the above-identified patent and that said Letters Patent is hereby corrected as shown below:

In the Claims

Column 10, Line 22 (claim 2), replace "wherein a" with --wherein $\alpha$--;

Line 28 (claim 4), replace "$Li_\alpha Na_\beta K_\chi BH_4$" with --$Li_\alpha Na_\beta K_\chi BH_4$--;

Lines 29-30 (claim 4), replace "$Li_\alpha K_X Rb_\delta BH_4, Li_\alpha K_X Cs_\epsilon BH_4$" with
--$Li_\alpha K_X Rb_\delta BH_4, Li_\alpha K_X Cs_\epsilon BH_4$--;

Line 30 (claim 4), replace "and $Li_\alpha Na_\beta K_X Rb_\epsilon BH_4$" with
--$Na_\beta K_X Rb_\delta BH_4$ and $Li_\alpha Na_\beta K_X Rb_\delta BH_4$--.

Signed and Sealed this
Thirty-first Day of December, 2013

Margaret A. Focarino
*Commissioner for Patents of the United States Patent and Trademark Office*